(12) United States Patent
Chen et al.

(10) Patent No.: US 6,256,090 B1
(45) Date of Patent: Jul. 3, 2001

(54) METHOD AND APPARATUS FOR DETERMINING THE SHAPE OF A FLEXIBLE BODY

(75) Inventors: Peter C. Chen, Arlington, VA (US); James S. Sirkis, Burtonsville, MD (US)

(73) Assignee: University of Maryland, College Park, MD (US)

( * ) Notice: Subject to any disclaimer, the term of this patent is extended or adjusted under 35 U.S.C. 154(b) by 0 days.

(21) Appl. No.: 09/127,083

(22) Filed: Jul. 31, 1998

Related U.S. Application Data

(60) Provisional application No. 60/053,756, filed on Jul. 31, 1997.

(51) Int. Cl.[7] .................................................. G01N 21/00
(52) U.S. Cl. ...................................... 356/73.1; 250/227.14
(58) Field of Search ................ 356/73.1, 32; 250/227.14, 250/227.24, 227.18, 231.1; 385/28

(56) References Cited

U.S. PATENT DOCUMENTS 5,641,956 * 6/1997 Vengsarkar et al. .................... 385/28

* cited by examiner

*Primary Examiner*—Frank G. Font
*Assistant Examiner*—Tu T. Nguyen
(74) *Attorney, Agent, or Firm*—Venable; James R. Burdett

(57) ABSTRACT

A fiber optic measurement system capable of greatly improving the cost, complexity, and efficiency with which flexible body shape estimates are made. The fiber optic shape measurement system uses Bragg grating sensor technology and time, spatial, and wavelength division multiplexing, to produce a plurality of strain measurements along one fiber path. Using a plurality of fibers, shape determination of the body and the tow cable can be made with minimal ambiguity. Also disclosed is a method to resolve the body shape based on strain-to-shape structural analysis. Possible applications include, but are not limited to, sensing the shape and position of flexible bodies, aid in improving the efficiency of existing acoustic surveying processing techniques, and related applications in geophysical prospecting.

71 Claims, 8 Drawing Sheets

$$P = I_oR(1-R)^{2(n-1)}$$

P = Power Reflected From Farthest Grating
R = Grating Reflectivity
n = Number of Gratings

METHOD AND APPARATUS FOR DETERMINING THE SHAPE OF A FLEXIBLE BODY

CROSS-REFERENCE TO RELATED APPLICATIONS

This application is related to provisional patent application Ser. No. 60/053,756, filed Jul. 31, 1997.

BACKGROUND OF THE INVENTION

1. Field of the Invention

The present invention relates generally to methods and apparatus for determining the shape of a flexible body, and more particularly to such methods and apparatus which utilize Bragg grating sensors, time, spatial and wave division multiplexing and strain-to-shape structural analysis to resolve the shape of such flexible bodies.

2. Statement of the Prior Art

Flexible bodies, such as those used as sonar receivers and for conducting seismic surveys for the purposes of oil and gas exploration, have two long-standing problems. One is the inherent cost, complexity and unreliability of conventional electromechanical heading and depth sensors used for shape estimation. Second is the difficulty and expense of handling that class of these devices typically mounted external to the arrays. In addition, accurate mathematical processing of array data is often compromised by the uncertain geometry of the towed array. In surface ships, for example, waves induce heave and surge motions in the towing vessel which propagate down the towing cable to the array itself. On the other hand in submarines, underwater currents, temperature, and density variations may also cause deformation of the array. Even when such environmental factors are minimal, any change in the course of the towing vessel necessitates waiting from ten minutes to more than an hour while the array becomes sufficiently straight and quiescent. The duration of this settling period depends upon the geometry of the array and its towing cable, local environmental conditions, speed of the towing vessel, and the severity of its maneuvers. Waiting for stability and/or quiescence is costly as well as time-consuming. Therefore, it is important to be able to perform real-time shape sensing with shape sensing of such arrays.

In marine seismic survey applications, up to twelve parallel towed arrays (i.e., "streamers") of approximately five kilometers each are deployed. To control the depth of the streamers, multiple leveling devices, or birds, are attached to the streamers as they are deployed. Because there are no means to control the displacement of the streamers parallel to the water surface, magnetic heading sensors (e.g., compasses) are incorporated into the birds to infer the streamer shape. This shape estimation scheme requires a vast amount of heading sensor data to be acquired during the survey, at the expense of collecting seismic acoustic data. and adds complexity to the deployment and retrieval operations.

Shorter arrays, such as the United States Navy's most advanced towed bodies (e.g., TB-29). are typically equipped with two environmental sensor modules located near the forward and aft positions of the towed array. Each module contains a total of ten sensors for measurements of depth, heading, roll, and tension of the towed array. There are also an additional three heading, depth, and roll sensors located in each of the eight aft acoustic modules. A vast amount of sensor data is used in conjunction with complex hydrodynamic mathematical models of flexible body behavior to infer shapes of the array. As a result, the primary disadvantage of such arrays are their relatively high cost and complexity, part of which is due to these sensors. It would, therefore, be desirable to provide a less expensive, far simpler shape determination scheme.

Considerable research and development has been directed in recent years towards the application of fiber optic technology in ocean engineering applications. Fiber optic technology has been tested in a wide variety of uses, including data transmission, secure communications, hydrophones, magnetometers, strain and temperature sensors, and guided munitions.

In addition to data transmission applications, fiber optic Bragg gratings have been used as low-cost, high-volume sensors for structural health monitoring in a variety of environments, including bridges, buildings, highways, aircraft, ships and spacecraft. This invention extends this technology to the realm of highly flexible structures such as cables, seismic streamers, and other types of arrays. Accordingly, it would also be desirable to provide a relatively inexpensive, simple shape determination scheme using fiber optic technology.

Fiber optic technology has also been widely exploited for ocean surveying acoustic arrays. Many advanced commercial and military systems incorporate uses of fiber optics- These arrays transmit data via multi-mode fiber optic busses to reduce the complexity, weight, and cost of analog multi-strand cables. Optical fiber-based hydrophones are also used in some applications for enhanced performance and reduced cost. Based on these trends towards the widespread adoption of fiber optic technology in acoustic arrays, it is desirable to leverage such existing use of optical fibers to provide a retrofitable, high-performance, array shape measurement technique at low cost.

In this regard, it would be desirable to provide inexpensive, simple fiber optic shape determination systems and methods for flexible bodies and other applications (e.g., in-flight refueling, remotely piloted vehicles, mining, construction, and other uses of flexible boring machines, and placing and positioning of moored navigational buoys).

SUMMARY OF THE INVENTION

The present invention is a cost-effective, reliable means for determining the shape of a flexible body such as ocean surveying acoustic arrays. Methods and apparatus according to the present invention utilize a mechanically-robust, fiber optic sensor (FOS)-based shape measurement means, which exploits the multiplexing capability intrinsic to fiber optic Bragg grating sensors in conjunction with strain-to-shape algorithms to provide real-time shape measurements.

BRIEF DESCRIPTION OF THE DRAWINGS

FIG. 3($b$) graphically depicts power as a function of wavelength from a broadband source;

FIG. 3($c$) graphically depicts the spectrum reflected by the apparatus shown in FIG. 2 through such Bragg grating sensors;

DETAILED DESCRIPTION OF THE INVENTION

Figure 1:
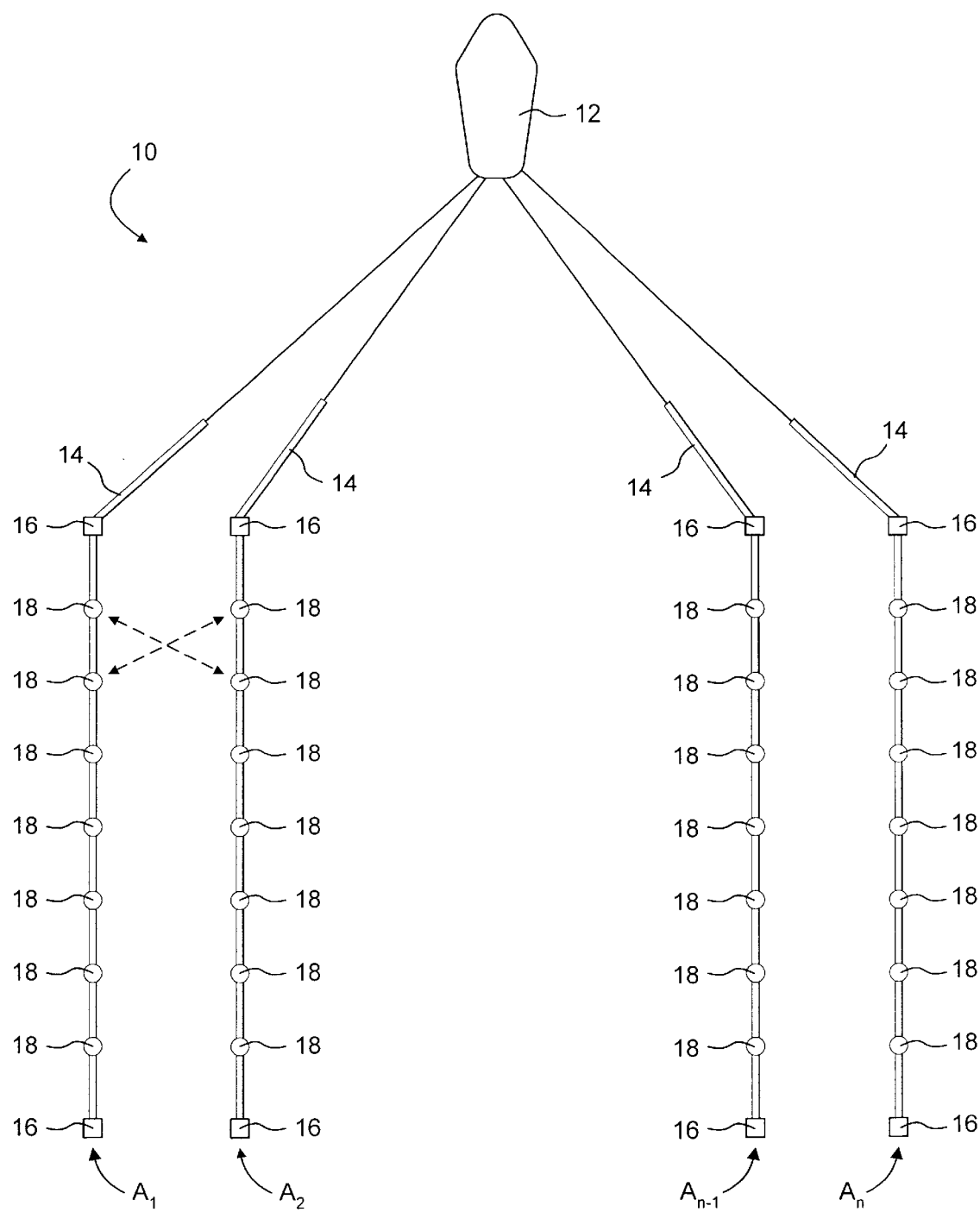
FIG. 1 is a schematic diagram of a seismic survey system according to the prior art.

Referring now to the drawings, wherein like reference characters and numbers designate like or corresponding parts throughout the several views, there is shown in FIG. 1 a schematic diagram of a seismic survey system 10 according to the prior art. Oil and gas exploration efforts worldwide make extensive use of a plurality of hydrophone arrays $A_1$, $A_2$, $A_{n-1}$ and $A_n$ to find offshore oil and gas deposits. Such arrays $A_1$, $A_2$, $A_{n-1}$, and $A_n$ are typically five kilometers long and cost in excess of $1 million each. There are nearly 100 such exploration ships operating worldwide today. Enabled by greater computer processing power and new, stronger streamer materials, the industry is moving toward larger surveys in deeper waters using bigger ships with up to twelve to fifteen "streamers" in tow.

Each streamer 14 is comprised of a plurality of discrete, 300-meter long sections of cable. At both ends of the streamers 14 is a global positioning system (GPS) receiver adapted to provide accurate information with regards to the position of its respective ends. In this manner, an estimate can be made of the positions of each hydrophone 18 within a given array $A_1$, $A_2$, $A_{n-1}$ and $A_n$. The towing vessel 12, with its twelve to fifteen streamers spread out behind, conducts its seismic survey 24 hours a day, seven days a week until a given survey field is completed. Therefore, it would be of immense help to such seismic survey towing vessels to more quickly complete the survey field. This can be accomplished with the method and apparatus according to the present invention by enabling collection of data even during turns and other maneuvers of the towing vessel 12, and facilitating handling and rapid replacement of modules as they become damaged or in need of repair by eliminating externally mounted heading sensors.

By providing real-time shape information about the streamers, one can obtain (1) improved survey data, increasing the probability of identifying offshore gas and oil deposits; and (2) reduce survey time by eliminating the need for repeated passes along survey lines. Furthermore, the shape sensing system according to the present invention will potentially reduce the complexity and cost of existing shape estimation systems.

There are several known methods and apparatus for determining the shape of a flexible body in dynamic situations. See, e.g., Ruffa, A. A., "A Shape Estimation Scheme for the Towed Active Receiver System (TARS)," *U.S. Navy Journal of Underwater Acoustics*, Vol. 45, No. 4 (1995), pp. 983–992; Howard, B. E., Syck, J. M., "Calculation of the Shape of a Towed Undervater Acoustic Array," IEEE Journal of Oceanic Engineering, Vol. 17, No. 2. April 1992, pp. 193–203; and Wahl, D. E., "Towed Array Shape Estimation Using Frequency-Wavenumber Data," *IEEE J of Oceanic Engineering*, October 1993, the contents of which are incorporated herein by reference. In none of these known methods and apparatus, however, are fiber Bragg grating sensors (FBG) used.

In-fiber Bragg gratings (FBG) are well-known and were developed as narrow band optical filters for the telecommunications industry. See, e.g., Meltz, G. R., Morey, W. W., and Glen, W. H., "Formation of Bragg gratings in Optical Fibers by a Transverse Holographic Method," *Opt. Letts.*, 14, pp. 823–825, 1989; Hill, K. O., Malo, B., Bilodeau, and Johnson, D. C., "Photosensitivity in Optical Fibers" *Ann. Rev. Mater. Sci.*, 125, 1993; and Morey, W. W., Ball, G., Singh, H., "Applications of Fiber Grating Sensors," *SPIE Vol. 2839, Fiber Optic and Laser Sensors XIV*, February, 1996, the contents of which are incorporated herein by reference. See also, Kersey, A. D. et al., "Multiplexed Fiber Bragg grating Strain Sensor System with a Fiber Fabry Perot Wavelength Filter," *Optics Letters*, 18, p. 1370, 1993; and 3M Fiber Bragg grating Application Note, "The Mechanical and Optical Reliability of Fiber Bragg gratings," February, 1996, the contents of which are also incorporated by reference. Recent television commercials by leading telephone companies describe the capability of transmitting as many as hundreds of telephone calls on the same optical fiber link. This is made possible with wavelength division multiplexing (WDM) using Bragg grating or equivalent spectral filtering technology. This intrinsic WDM capability also makes in-fiber Bragg gratings one of the most promising sensor technologies. As will be explained below, this WDM capability can be combined with spatial division multiplexing schemes, based on optical switching technology, to enable literally hundreds of sensors to be multiplexed and decoded using the same hardware used to decode just a few sensors. The following provides background material for Bragg grating sensors to place the inventive flexible body shape sensor technology disclosed herein in the proper perspective.

Figure 3A:
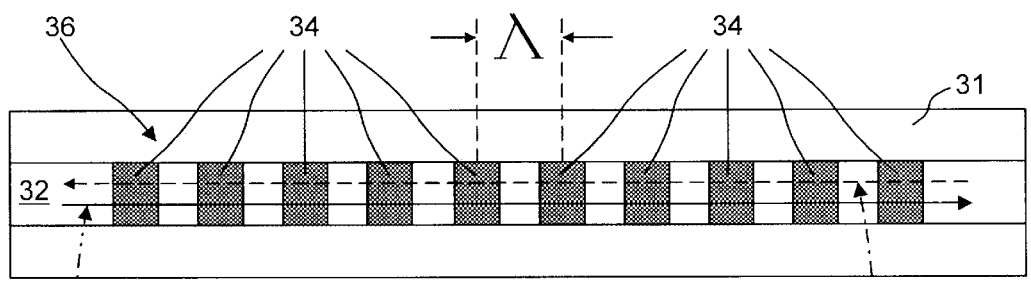
FIG. 3($a$) demonstrates the basic operating principle of known Bragg grating sensors.
Figure 3B:
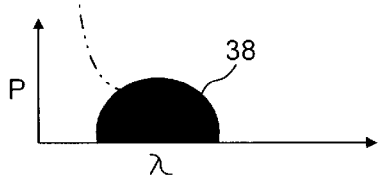
Figure 3C:
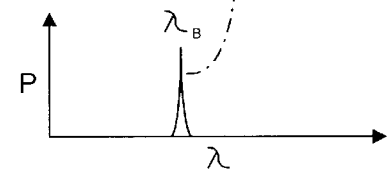

Bragg gratings are fabricated by exposing the fiber to a periodic intensity profile produced by coherent interference. Referring for the moment to FIGS. 3(a), 3(b) and 3(c), it can be seen that the refractive index of a conventional germanium-doped optical fiber core 32 changes where the intensity is brightest to produce a periodic refractive index profile, or periodicities 34 as illustrated in FIG. 3(a). The pitch of the in-fiber Bragg grating 36, Λ, is controlled during the manufacturing process, but is typically around 0.5 μm. The amplitude of the periodicity is only the order of 0.1% to 0.01% of the original refractive index, such that the grating 36 appears to be an ordinary optical fiber to the human eye.

The operating principles of an ideal Bragg grating sensor is illustrated in FIGS. 3(b) and 3(c), where light from a broadband source 38 (e.g., a superluminescent diode (not shown)), interacts with the grating 36. The cumulative effect of optical scattering from the many periodicities 34 in the refractive index profile is to reflect a single wavelength, called the "Bragg wavelength" of intensity, P. This Bragg wavelength is related to the grating pitch, Λ, and the mean refractive index of the core 32, n, by the equation:

$$\lambda_B = 2\Lambda n \qquad (1)$$

The refractive index of the optical fiber and its in-line Bragg grating pitch both vary with strain and temperature. Accordingly, the Bragg wavelength shifts left or right, as illustrated by the opposing arrows in FIG. 4(b), in response to applied thermo-mechanical fields (agged arrows in FIG. 4(a)).

When light interacts with the grating 36 (as shown by the solid horizontal arrow in FIG. 3(a)), each index periodicity 34 scatters a small amount of light such that only a single wavelength is reflected (as shown by the dotted horizontal arrow in FIG. 3(a)). This wavelength is the Bragg wavelength. In the case of a Bragg grating sensor 36 bonded to the surface of a structure (not shown), the strain and temperature are related to the change in the Bragg wavelength by the equation:

$$\frac{\Delta \lambda_B}{\lambda_B} = P_e \varepsilon_{zz} + [P_e(\alpha_s - \alpha_F) + \zeta]\Delta T \qquad (2)$$

where $\alpha_s$ and $\alpha_f$ are the coefficients of thermal expansion of the structural material and fiber, respectively, $\zeta$ is the thermal-optic coefficient, and $P_e$, is the strain-optic coefficient. Conventional Bragg grating sensors which are bonded to a polyurethane towed array body have coefficients for strain and temperature of 0.79 and 17.79 $\mu\epsilon/C°$, respectively. A 1° C. temperature change, therefore, produces a shift in Bragg wavelength equivalent to 22.5 $\mu\epsilon$. This level of thermal apparent strain must be accounted for through careful sensor design for the present invention to be successful.

Figure 4A:
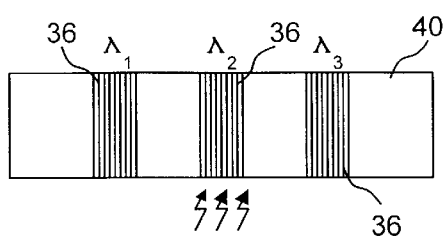
FIG. 4(a) illustrates a plurality of Bragg grating sensors reacting to thermo-mechanical loads.
Figure 4B:
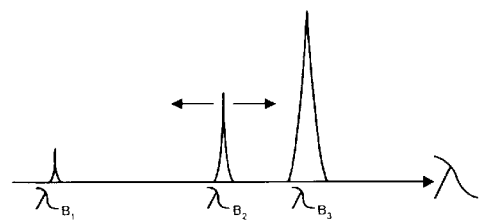
FIG. 4(b) graphically depicts the response of the Bragg grating sensors shown in FIG. 4(a) to such thermo-mechanical loads.

Sensor multiplexing is accomplished by producing a fiber 40 with a sequence of spatially separated gratings 36, each with different grating pitches, $\Lambda_i$, i=1, 2, 3, . . . , as illustrated in FIG. 4(a). The output of the multiplexed sensors is processed through wavelength selective instrumentation (e.g., the multiplexing signal processing means 28 shown in FIG. 2, or any suitable scanning optical bandpass filter such as that shown in FIG. 9). In this case, the, reflected spectrum will contain a series of peaks (as shown in FIG. 4(b)), each associated with a different Bragg wavelength given by the equation:

$$\lambda_{Bi} 2n\Lambda_i \qquad (3)$$

For example, the measurement field at grating #2 is uniquely encoded as a perturbation Bragg wavelength, $\lambda_{B2}$. Note that this multiplexing scheme is completely based on the optical wavelength of the Bragg grating sensors. The upper limit to the number of gratings that can be addressed in this way is a function of the source profile width and the expected strain range. The read-out system shown in FIG. 6 can multiplex 24 sensors along a single fiber path.

In one prototype array that was built according to the present invention, a total of 36 Bragg grating sensor nodes were interrogated by a combination of a fiber Bragg grating Interrogation System (FBG-IS) manufactured by Micron Optics, Inc. for wavelength division multiplexing, and a DiCon Fiber Optics 1×4 switch for spatial division multiplexing. See FIG. 6. Further expansion of the current spectral range of the FBG-IS 80 nm can be expected. In such a manner, more sensors can be multiplexed, strain resolution will be improved, and stability of the system can be facilitated by using improved sampling strategies. In addition, a 1×5 switch may be used to develop hardware capable of monitoring 660 Bragg grating sensors. See FIG. 6 for further details relating to the scalability of such a system according to the present invention to a 1×N optical switch to develop hardware capable of monitoring M Bragg grating sensors.

Second only to multiplexibility, the "self-referencing" or "absolute" nature of Bragg grating sensors is the most important quality offered by the methods and apparatus according to the present invention. Self-referencing refers to the fact that measurements can be made relative to the time when the sensor is manufactured. As a result, measurements are not interrupted if the electronic instrumentation is turned off. In an analogy to resistance strain gage technology, Bragg grating sensors do not require "bridge balancing" required of conventional resistance strain gages. This feature is invaluable in applications involving measurement over days, months, or years.

Because Bragg gratings are used in telecommunications systems, they have been subjected to a battery of humidity and temperature cycling tests. Environmental tests conducted to date suggest that temperature and humidity have limited influence of the optical characteristics of Bragg gratings. No change in grating properties were observed after 1000 hours of 80 at 85% relative humidity, nor were any changes in grating properties observed after 1000 thermal cycles from −40° to 85° C. or 512 cycles from 21° to 427° C. Thus, it can be seen that systems utilizing Bragg grating sensors according to the present invention will be mechanically reliable.

Figure 2:
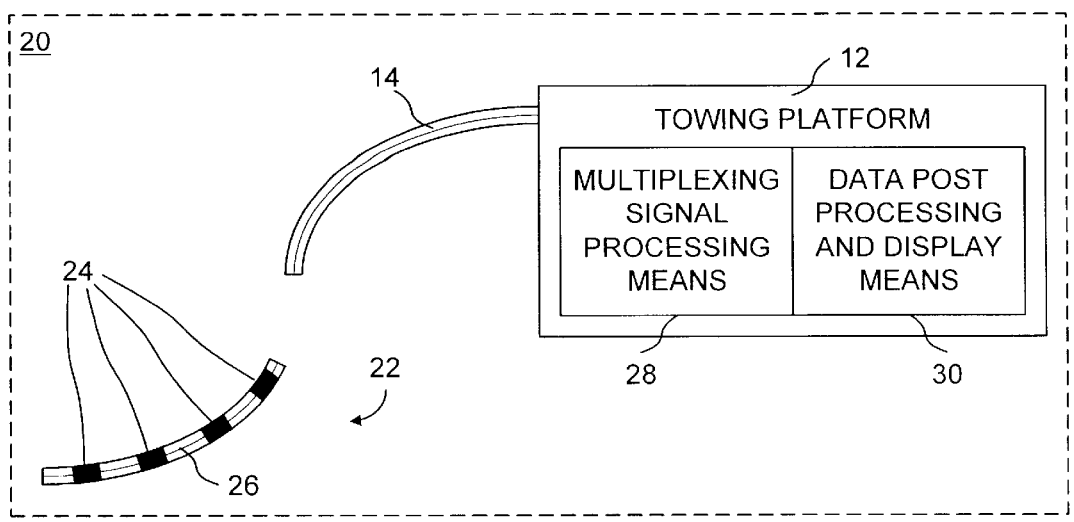
FIG. 2 illustrates one method and apparatus for determining the shape of a flexible body, such as the seismic survey array shown in FIG. 1. according to a first embodiment of the present invention.

Referring for the moment back to FIG. 2, it can be seen that the apparatus 20 according to one embodiment of the present invention uses hybrid wavelength division/spatial division multiplexing to make measurements at a plurality of "fiber optic measurement nodes" 24 along the body 22. Strain-based structural algorithms are thereafter used to determine the shape.

Figure 5A:
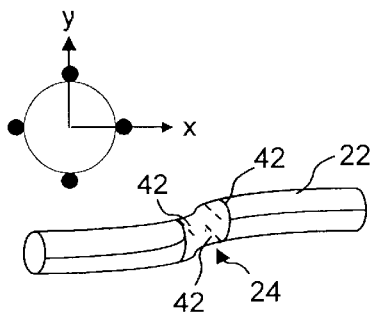
FIG. 5(a) depicts the preferred locations of such Bragg grating sensors in a system according to the present invention under ideal conditions.
Figure 5B:
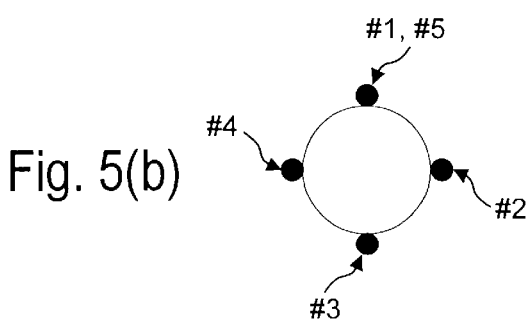
FIG. 5(b) depicts the locations of such Bragg grating sensors in a system according to the present invention under operational environmental conditions.

Under ideal laboratory conditions, measuring the x and y bending strains at each fiber optic measurement node (as illustrated in FIGS. 5(a) and 5(b)) is sufficient to determine the body shape. However, the operational environment of towed arrays is far from "ideal." Thermal gradients and hydrodynamic drag produce thermal apparent and structural extensional strains, respectively, that are not associated with bending. Accordingly, one presently preferred embodiment uses the sensor architecture shown in FIG. 5(a). Three strain sensors (sensors #1, #2, and #3) in this arrangement respond identically (within experimental limits) to axial deformation and temperature, but differently to bending, while the temperature sensor #4 provides temperature information independent of strain. Use of the four sensors per fiber optic measurement node 24 is best explained by examining the superposition process that produces the strains measured by sensors #1, #2, and #3 in FIG. 5(a). Four measurements are sufficient to determine the extensional and bending shapes. The total strains measured by the three strain and one temperature sensors are given by the following equations:

$$\bar{\epsilon}_1 = A_1(\epsilon_{bending-x} + \epsilon_{axial} + \epsilon_{thermal-mech}) + \epsilon_{thermal-apparent} + B_1\gamma_{xy} \quad (4)$$

$$\bar{\epsilon}_2 = A_1(\epsilon_{bending-x} + \epsilon_{axial} + \epsilon_{thermal-mech}) + \epsilon_{thermal-apparent} + B_1\gamma_{xy} \quad (5)$$

$$\bar{\epsilon}_3 = A_1(\epsilon_{bending-x} + \epsilon_{axial} + \epsilon_{thermal-mech}) + \epsilon_{thermal-apparent} + B_1\gamma_{xy} \quad (6)$$

$$\bar{\epsilon}_4 = \epsilon_{thermal-apparent} \quad (7)$$

where $\epsilon_{bending-x}$ and $\epsilon_{bending-y}$ are the strains due to bending about the x and y axes, respectively, $\epsilon_{axial}$ is the strain due to elongation of the body, $\epsilon_{thermo-mech}$ is the thermal strain due to the coefficient of thermal expansion mismatch between the optical fiber and the body, and $\epsilon_{thermal-apparent}$ is due to the intrinsic thermal sensitivity of Bragg grating sensors. The intrinsic thermal sensitivity of Bragg grating sensors is due to the temperature dependence of the refractive index. This effect, which is unrelated to the thermo-mechanical load field, is of the same order of magnitude as the strain induced Bragg grating response. It should be noted, however, that the bending strains at positions #1 and #3 are equal in magnitude and opposite in sign because they are located the same distance above and below neutral axis of the body. Additionally, all three strain sensors have the same contributions from $\epsilon_{axial}$, $\epsilon_{thermo-mechanical}$, and $\epsilon_{thermal-apparent}$. The bending strains and the sum of the axial and thermo-mechanical strains, can be found from the above equations using simple algebraic manipulations to yield the following:

$$\varepsilon_{bending-x} = \frac{(\varepsilon_1 - \varepsilon_3)}{2} \quad (8)$$

$$\varepsilon_{bending-y} = \varepsilon_2 - \frac{(\varepsilon_1 + \varepsilon_3)}{2} \quad (9)$$

$$\varepsilon_{axial} + \varepsilon_{thermal-mech} = \frac{(\varepsilon_1 + \varepsilon_3)}{2} - \varepsilon_4 \quad (10)$$

To implement this measurement concept (with four measurements per fiber optic measurement node 24), the bodies 22 are instrumented with four optical fiber leads 42 (FIG. 5(a)), each containing arrays of Bragg grating sensors 40. It is also important to note that it may be necessary to account for torsional deformations in the body 22 by way of a refined shape measurement algorithm. Such torsional deformation sensing of the body 22 is possible by attaching one of the three fibers helically (sensor #5 oriented at about 40° 50°—and more preferably 45°—with respect to the longitudinal axis of the body 22). This helical fiber would, thus. sense the combined torsional, bending, and axial strains along the body, which could be decoupled using strain transformation techniques.

In accordance with one presently preferred embodiment of the invention, four arrays of FBG sensors are used such that each "measurement node" 24 consists of four sensors located at the same position down the longitudinal axis of the flexible body 22, at azimuthal angles of 0, 90, 180, and 270 degrees (see FIG. 5(a)). This sensor architecture facilitates the measurement of bending strains in two dimensions, and compensates for temperature and extensional strain effects. This will be sufficient to resolve the flexible body shape in three dimensions as long as shear strain effects are negligible. Although most seismic arrays are neutrally buoyant and are torque balanced, moderate array twist deformations on the order of four turns (over a several hundred foot span) can be expected for steady-state towing conditions. Accordingly, this may give rise to consideration of shear strain, and hence, array twist in formulating a shape determination algorithm.

Under ideal laboratory conditions, measuring the x and y bending strains at each measurement node 24 is sufficient to determine the flexible body shape. However, thermal gradients and hydrodynamic drag will produce thermal apparent strains, shear strains (through tension-torsion coupling), and extensional strains, respectively, that are not associated with bending. Accordingly, a five- sensor architecture similar in nature to the above-described four-sensor architecture is more preferable. Three strain sensors (sensors #1, #2, and #3 in FIG. 5(b)) in this arrangement will respond identically (within experimental limits) to axial deformation, torsion, and temperature, but differently to bending, A temperature sensor (sensor #4 in FIG. 5(b)) will provide temperature information independent of strain, while a fifth sensor (sensor #5 in FIG. 5(b)) is located very close to sensor #1 and designed so that it responds differently to torsion than do sensors #1, #2, and #3. It has been concluded, therefore, that these five measurements will be sufficient to determine the extensional and bending shapes.

Use of the five sensors per measurement node architecture is best explained by examining the superposition process that produces the sensor signals. The total effective strains seen by strain sensors #1, #2, #3 and temperature sensor #4 are given by $$\bar{\epsilon}_1 = A_1(\epsilon_{bending-x} + \epsilon_{axial} + \epsilon_{thermal-mech}) + \epsilon_{thermal-apparent} + B_1\gamma_{xy} \quad (4)$$

$$\bar{\epsilon}_2 = A_1(\epsilon_{bending-x} + \epsilon_{axial} + \epsilon_{thermal-mech}) + \epsilon_{thermal-apparent} + B_1\gamma_{xy} \quad (5)$$

$$\bar{\epsilon}_3 = A_1(\epsilon_{bending-x} + \epsilon_{axial} + \epsilon_{thermal-mech}) + \epsilon_{thermal-apparent} + B_1\gamma_{xy} \quad (6)$$

$$\bar{\epsilon}_4 = \epsilon_{thermal-apparent} \quad (7)$$

where $\epsilon_{bending-x}$ and $\epsilon_{bending-y}$ are the strains due to bending about the x and y axes, respectively, $\epsilon_{axial}$ is the strain due to elongation of the towed array, $\epsilon_{thermo-mechanical}$ is the thermal strain due to the coefficient of thermal expansion mismatch between the optical fiber and the flexible body, and $\epsilon_{thermal\ apparent}$ is due to the intrinsic thermal sensitivity of Bragg grating sensors. The intrinsic thermal sensitivity of Bragg grating sensors is due to the temperature dependence of the refractive index. The constants $A_1=(\cos^2\psi-\upsilon\sin^2\psi)$ and $B_1=(\cos\psi\sin\psi)$ are coefficients that arise from the strain transformation equations used to account for the fact that the sensors will be helixed at an angle $\psi$ to enhance sensor survivability. For a circular cross-section body undergoing torsional deformation, there is no warping so that twisting relative to the body span produces only the shear strain component, $\gamma_{xy}$, and no normal strains in the coordinate system defined by the array body symmetries. This means that the only normal strains present are due to bending and extension effects and that the shear strain is equal at all sensor radial locations. Solving equations (4) though (7) for the bending strains in the x and y planes yields $$\varepsilon_{bending-x} = \frac{(\bar{\varepsilon}_1 - \bar{\varepsilon}_3)}{2A_1} \quad (11)$$

-continued $$\bar{\varepsilon}_{bending-y} = \frac{1}{A_1}\left[\bar{\varepsilon}_2 - \frac{(\bar{\varepsilon}_1 + \bar{\varepsilon}_3)}{2}\right] \quad (12)$$

Inspection of equations (4) through (7) reveals that there are more unknowns than available equations, so that it is not possible to solve for $\gamma_{xy}$. Attaching an additional fiber grating, adjacent to sensor #1, at orientation angle, β, would provide one additional equation to resolve the shear strain. The fifth sensor equation is:

$$\bar{\varepsilon}_5 = A_2(\varepsilon_{bending-x} + \varepsilon_{axial} + \varepsilon_{thermal-mech}) + \varepsilon_{thermal-apparent} - B_2\gamma_{xy} \quad (13)$$

where the new tensor transformation coefficients are defined as $A_2 = [\cos^2(\beta) - \upsilon\sin^2(\beta)]$ and $B_2 = [\cos(\beta)\sin(\beta)]$. For simplicity of discussion, the orientation of the fifth sensor is chosen such that $\beta = -\psi$ degrees relative to the array body span, which reduces the tensor coefficients in equation (13) to $A_1 = A_2$ and $B_1 = B_2$. Substituting these expressions into equation (13) yields $$\bar{\varepsilon}_5 = A_1(\varepsilon_{bending-x} + \varepsilon_{axial} + \varepsilon_{thermal-mech}) + \varepsilon_{thermal-apparent} - B_1\gamma_{xy} \quad (14)$$

As a result, the shear strain can be found from equations (6), (11), and (14) to yield $$\gamma_{xy} = -\frac{1}{2B_1}[\bar{\varepsilon}_5 - \bar{\varepsilon}_1] \quad (15)$$

It is important to note that an attachment and angle of $-\psi$ is chosen for sensor #5 so that a simple closed-form solution can be provided for the shear strain component. However, it may be necessary to re-evaluate this fiber orientation angle to determine an optimal angle for sensor #5 to minimize modifications to the existing body manufacturing process.

The following electro-optical system may be used to interrogate the body strains to compute the array shape. First, it may be assumed that a minimum system should be required to interrogate 50 discrete Bragg grating sensors. Then, consideration should be made with respect to the data transmission strategies required to use existing multimode fiber optic data buses typically found in advanced optical acoustic array systems.

Figure 6:
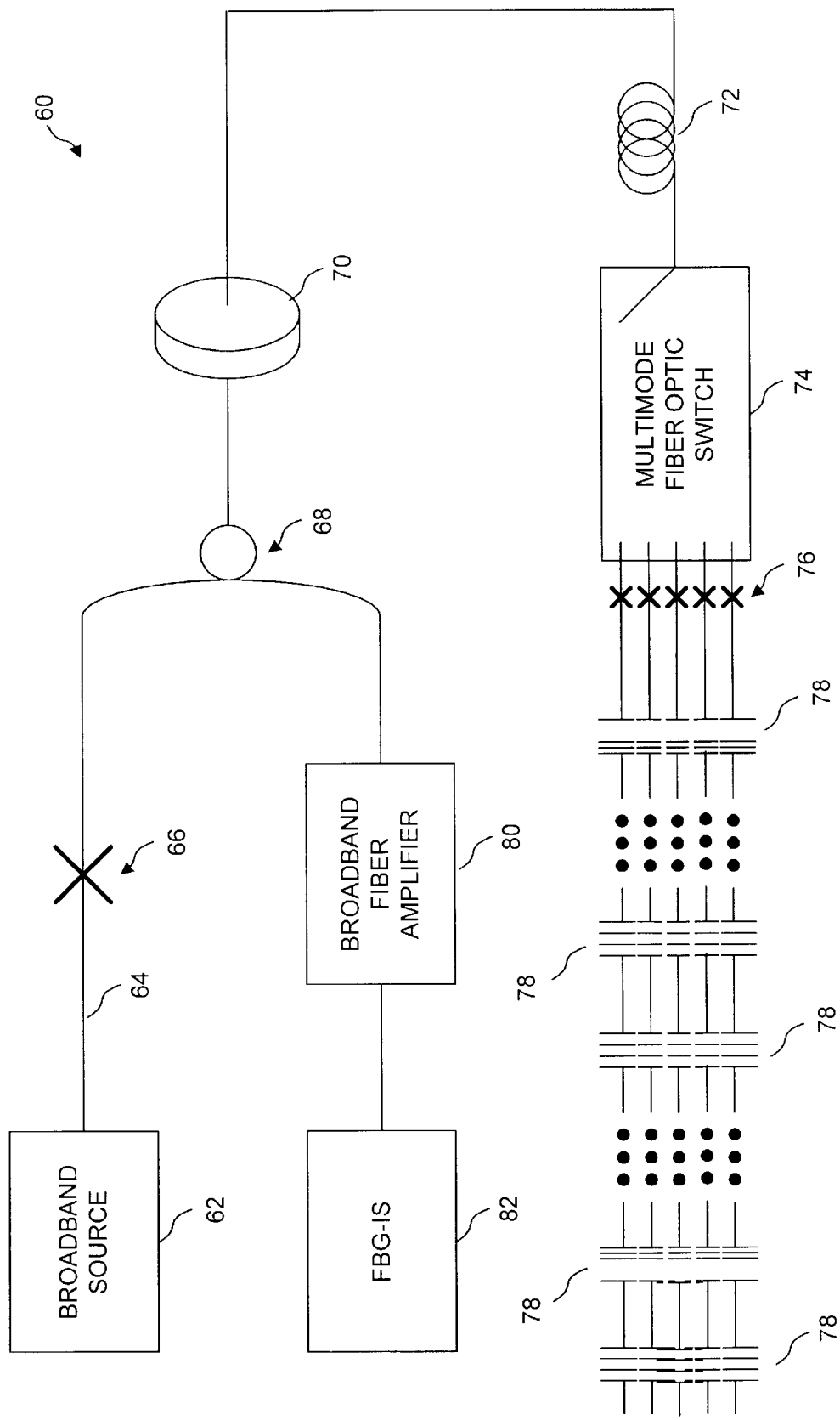
FIG. 6 is a schematic diagram of a method and apparatus for determining the shape of a flexible body according to another embodiment of the present invention.

Referring now to FIG. 6, there is shown a shape sensing system 60 to another embodiment of the present invention which is designed to interrogate a typical 140-foot multi-mode fiber array undergoing minimal deformations. The optical system 60 includes an 80 nm superfluorescence, broadband source 62, which injects light into one arm 64 of a single-mode 2×1 coupler 68. This light is coupled into a single channel, multimode fiber optic slip ring 70. The light then propagates through a multimode optical fiber tow cable. At the end of this multimode fiber is a multimode 1×5 optical switch 74 that sequentially directs the light to the five arrays 76 of 10 fiber Bragg gratings 78. The light reflected from these Bragg gratings 78 propagates back through the multimode optical fiber lead 72, slip ring 70, coupler 68, and then through an optical amplifier 80 to the modified FBG-IS 82. The optical amplifier 80 acts much like an electrical amplifier in that it receives low power optical signals and produces higher power optical signals. Furthermore, the optical amplifier 80 can be used to offset the optical losses which may be anticipated in the optical system 60. The following describes in further detail each of the above components.

Sensor system 60 must be completely compatible with standard multimode fiber data links. This approach enable ones to "piggy-back" the sensor signals on the existing fiber available in the array tow cables and arrays. Accordingly, it will also enable retrofit of existing arrays There are two possible approaches for transmitting the strain data back to the towing vessel 12. In the first approach, the strain data and the acoustic module data can propagate in the same fiber using well-known WDM techniques. The second option is to transmit the strain data separately using a spare (unused) fiber in the array.

The primary technical issue that must be addressed with both approaches is that the data link uses multimode fiber, whereas Bragg grating sensors are manufactured in single-mode fibers. Preliminary tests reveal that the overall structure of the grating spectra before and after transmission through the multimode fiber is nearly identical. However, the total optical power of the multimode fiber spectrum is reduced by a factor of 13 (11.2 dB). This power loss results from the fact that the light propagating from the multimode fiber into the single-mode fiber experiences significant insertion loss due to mode-field diameter mismatch. It also demonstrates two key points. The first is that Bragg gratings fabricated in single-mode fiber and located in the towed array can be successfully interrogated using the multimode fiber data link available in standard arrays. The second is that methods must be developed to overcome large multimode-to-single-mode insertion loss in order to implement the interrogation architecture proposed. Such high insertion loss can be overcome using a hybrid erbium-doped fiber amplifier (EDFA) in order to add optical gain to the light exiting the multimode fiber before it enters the FBG-IS 82.

The FBG-IS 82 is a commercial-off-the-shelf unit, similar to a dithered scanning tunable Fabry-Perot apparatus developed by Dr. Alan Kersey. See *Optics Letters*, 18, p. 1370, 1993 noted above. FBG-IS 82 is controlled by data acquisition software within the LabVIEW environment. An FBG-IS 82 with an 80 nm spectral range would be preferable to resolve more complex shapes, other than steady-state U-type shapes, without potential Bragg wavelength overlap.

Spectral bandwidth limitations of the current FBG-IS 82 may be remedied and at the same time anticipated optical losses at the single-mode fiber-to-multimode fiber interconnect offset. These objectives can be achieved using a BBS 15/16 D broadband superfluorescent fiber source 62, and a double bandwidth fiber amplifier 80, both of which are offered by AFC Technologies, Inc. The source 62 offers 15 mW of optical power in an 85 nm bandwidth. which is more than double the bandwidth offered by known erbium-doped superfluorescent sources. This enhanced bandwidth enables interrogation of up to 133 measurement nodes (665 sensors) in typical towed array operational environments. The double bandwidth fiber amplifier 80, on the other hand, provides optical gain in a 75 nm bandwidth. Thus, amplifier 80 can be used to overcome the anticipated insertion losses which result from using the multimode data lines with single-mode gratings.

Figure 7:
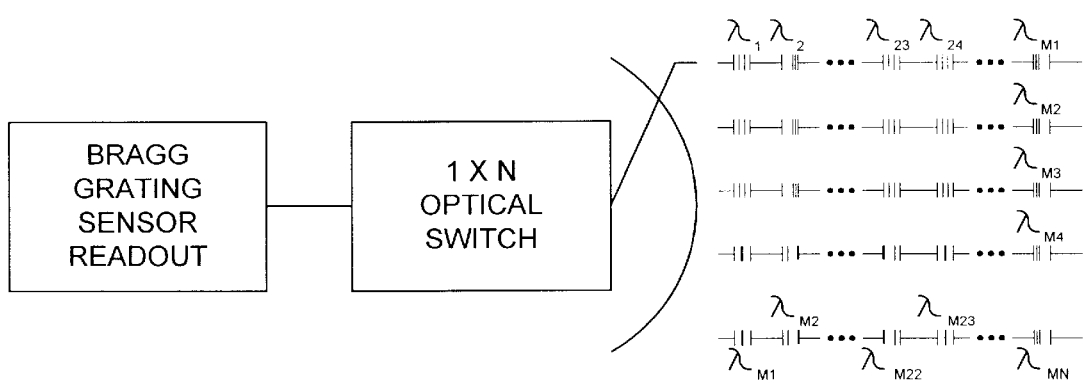
FIG. 7 is a block diagram of a method and apparatus for determining the shape of a flexible body according to yet another embodiment of the present invention.

In one embodiment, the system 60 according to the present invention uses a single FBG-IS 82 with a 1×4 optical switch to sequentially poll the grating sensors at the #1,#2, #3, and #4 locations. This approach was taken to reduce the number of FBG-IS units 82 which may be required to interrogate 36 sensors. It was also enabled by the typical low bandwidth measurement requirements for seismic survey streamers (less than 1 HZ). Switch 74 is controlled using a parallel port software algorithm, while data acquisition with an on-line visualization tool, TASIT, (to be described in greater detail hereinafter) can be implemented with a conventional Ni-DAQ 400 PCMCIA card manufactured by National Instruments. The 1×4 optical switch 74 effectively quadruples the number of sensors the FBG-IS 82 can interrogate. In turn, this enables nine measurement nodes. As alternative embodiments, a 1×5 switch 74 may be used to accommodate the three bending strain sensor arrays (i.e., sensor #1, #2, and #3), the torsional strain sensor array (i.e., sensor #5), and the temperature sensor array (i.e., sensor #4). As with the 1×4 switch, a 1×5 optical switch like most optical switches is controlled via a RS-232 serial port. Using serial port communications would necessitate significant modifications to standard platforms and tow cables to include a serial communication line. Accordingly, means should be provided to control the switch via an optical fiber link (this assumes that access to the electrical power bus of the flexible body can be provided). Likewise, a simplified alternative as shown in FIG. 7 may be used where a 1×N optical switch output is fed to the Bragg grating sensor readout.

After successfully embedding the gratings in the array body wall, the optical fibers should be terminated and interconnected with the coupler assembly. To access this coupler assembly, the optical fiber leads from the five fiber Bragg grating arrays will be passed through the interface of the two extrusions, through the swage fixture and fused with the 1×5 switch 74 that will be housed inside the flexible body. The input/output lead of the switch 74 will then be fused with one of the unused multimode fiber leads using conventional D. G. O'Brien electro-optical connectors. This approach facilitates an operational module to interface in a manner that is transparent to operational personnel.

The concept of the strain-to-shape algorithm is very straightforward and is made possible by the unique deformation characteristics of beams and plates. For example, in plates the strain in a symmetry direction is given by the equation:

$$\varepsilon = -z \frac{\partial^2 w}{\partial y^2} \tag{16}$$

where $\varepsilon$ is the strain and $w$ is the out-of-plane deformation of the plate, which contains the shape information. The out-of-plane deformation is determined by measuring the strains at several locations and fitting a two-dimensional higher order polynomial, $\epsilon(x,y)$, through the resulting strain data. This surface is then integrated twice, taking care to incorporate correct boundary and symmetry conditions, to yield the shape:

$$w(x, y) = -\frac{1}{Z} \int_0^L \int_0^L \overline{\varepsilon}(x, y) dx dy \tag{17}$$

This "fit and integrate" shape measurement method will be applied to the body by considering it to be a linearly elastic, circularly symmetric beam undergoing bending in two dimensions, axial, and thermal strain. Because the body can be treated as linearly elastic, the deformations due to the three types of loading (bending about the x-x and y-y neutral axes, and uniaxial tension) can be treated independently. The deformations due to the bending strains ($\epsilon_{bending-x}$ and $\epsilon_{bending-y}$) will be measured at each fiber optic measurement node and fit to moving spline functions $\epsilon_{bending-x}$ and $\epsilon_{bending-y}$. These functions will then be integrated twice to determine the x and y displacements:

$$u = \frac{1}{R} \int_0^L \int_0^L \overline{\varepsilon}_{bending-x} dz dz \tag{18}$$

$$v = \frac{1}{R} \int_0^L \int_0^L \overline{\varepsilon}_{bending-y} dz dz \tag{19}$$

where $u$ is the x-displacement and $v$ is the y-displacement. As noted herein above, it is necessary to account for torsional deformations in the body 22, which may be experienced under steady-state towing conditions. This, is turn, necessitates consideration of shear strain. Based on all of the foregoing, therefore, the torsional displacement along the length of the body 22 is difined by the equation:

$$\phi = \frac{1}{R} \int_0^L \gamma_{xy} dz \tag{20}$$

where $\Phi$ is the torsional deformation angle, R is the radius of the body 22, and $\gamma_{xy}$ is the shear strain in the x-y plane, as measure by the fifth sensors (sensor #5 in FIG. 5(b) in each array. A similar scheme will be applied to the combination of axial tension and thermal expansion, $\epsilon_{thermal-mechanical}$ but in this case the total thermo-mechanical strain is given by the equation:

$$\frac{dw}{dz} = \varepsilon_{axial} + \varepsilon_{thermo-mechanical} \tag{21}$$

Therefore this thermo-mechanical strain will be fit to a moving spline function, $\epsilon_{axial+thermal}(z)$, and integrated once, i.e., $$w = \int_0^L \varepsilon_{axial-thermal}(z) dz \tag{22}$$

The coefficients of the shape polynomial are currently computed from the strain measurements using the Frenet-Serret formulas, which relate derivatives (with respect to arc length) of the position vector to the curvature of the flexible body and hence the strains measured by the sensors. This approach, which is based on vector functions of arc length, is particularly well-suited to the systems and methods according to the present invention, because the strain measurements are at known arc length intervals. Further details regarding the Frenet-Serret formulas may be found in Hoffmann, C. M., *Geometric and Solid Modeling: An Introduction*, Morgan-Kaufmann, Palo Alto, Calif. (1989), the contents of which are incorporated herein by reference. Using the polynomial approximation of the position vector, the algorithm iteratively computes the shape of the body and corresponding local coordinate systems (called Frenet frames). Each local coordinate system consists of the unit tangent vector, the principal normal vector, and the binormal vector. The local coordinate system is then used to locate each point on the body in the global coordinate system in which the body shape is displayed. The local coordinate system of the first point (located at the first sensor on the body) is taken to be the global coordinate system. The algorithm then computes the shape of the body between the first and last sensor nodes. The Frenet-Serret formulas generalize and improve the algorithm proposed by Ruffa, and may be further refined to include the torsional strain resolution scheme presented herein.

Obviously, there is a choice of the first local coordinate system (which is also the global coordinate system) at the first sensor. This choice does not affect the shape of the array per se, but affects the orientation. The current algorithm, with no other input. renders a correct shape, but not a position with respect to some reference point (e.g., the ship). In order to get the orientation and/or the position of the body with respect to a reference point, another input is required: the location of the first sensor and/or the heading of the first sensor with respect to the reference point. Of course many known methods of making such a determination (e.g., GPS) are known, and can be readily incorporated within the methods and apparatus according to the present invention.

Figure 12:
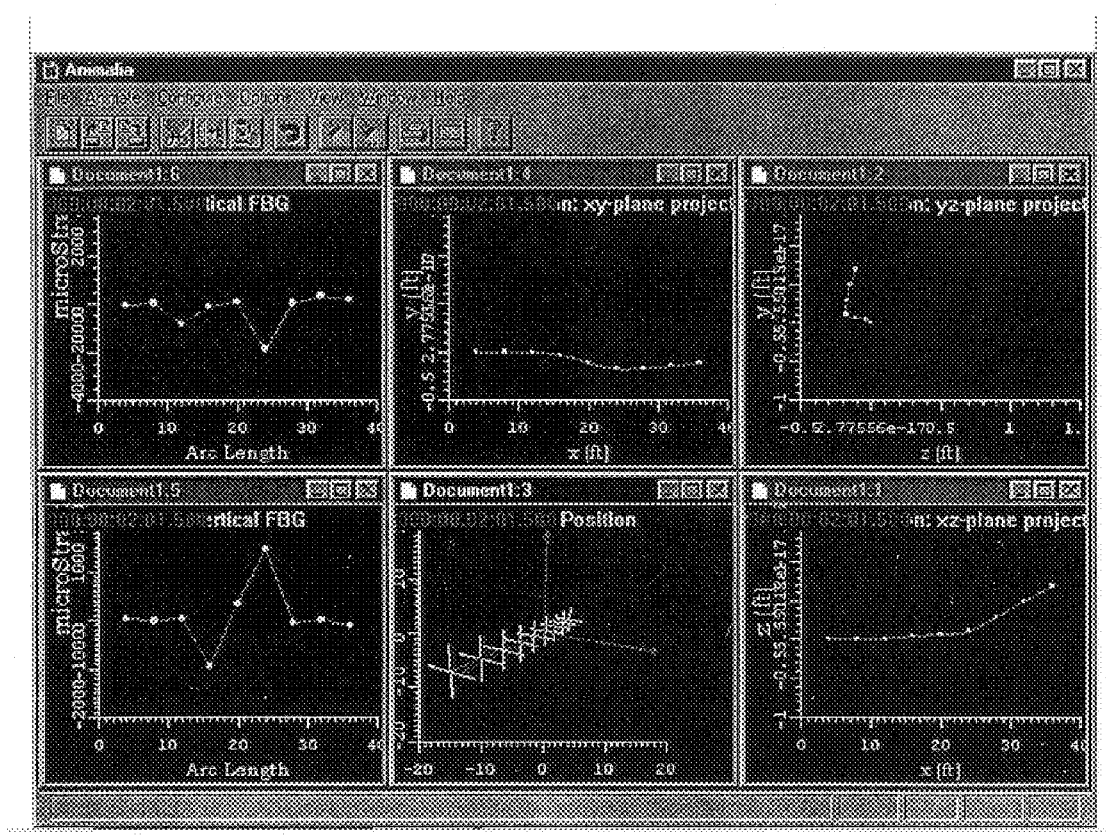
FIG. 12 is a screen capture from the post-signal acquisition signal processing and analysis means according to the present invention.

The strain-to-shape algorithm and associated software have also been incorporated herein for real-time and off-line visualization of the body shape. A real-time data acquisition and visualization system (TASIT) with functional elements including: (1) fiber optic switch control; (2) demodulator (i.e., Micron Optics Inc. proprietary device) control; (3) data archive: and (4) shape computation and visualization. Another software tool, ANIMALIA (Animated Line Array Analysis tool), provides a means for post-acquisition signal processing and analysis of the raw strains, including the computation of bending and tension strains, and for implementing the strain-to-shape algorithms within the scope of the teachings herein. This ANIMALIA tool has the ability to animate the resulting shapes over a wide range of speeds. and is provided for the primary purpose of visualization of the body shape dynamics at faster than real-time speeds. FIG. 12 displays a screen capture from ANIMALIA, and shows the bending strain in the vertical and horizontal planes for a U-shape deflection, as well as 2- and 3-D projections of the deformed body. ANIMALIA will also accept body shape data as input ground truth. Such data will be used to quantify and visualize shape estimation errors.

Without departing from the true spirit and scope of the present invention, the functions of TASIT and ANIMALIA may be conveniently integrated into one data acquisition/visualization software application. TASIT, developed in LabVIEW, provides control to the optical switch, as well as collects data from the Micron Optics FBG-IS. Referring now to FIG. 13. a screen capture of TASIT can be seen to show the body deflected in a sinusoidal shape. ANIMALIA. written in C code rather than LabVIEW, provides post-acquisition signal processing and visualization of the array shape dynamics at faster than real-time speeds. Communication between the programs can be accomplished via data files. ANIMALIA, thus, would read and display the data files only after data collection was completed.

Alternatively, the two programs can be merged to facilitate real-time dynamic exchange of data between the data acquisition and visualization functions. TASIT may be upgraded first to be compatible with latest versions of LabVIEW 5.0 (which features an ActiveX Automation Server capability that will allow users to call the TASIT program from any ActiveX client). ActiveX technology, as is well known, allows different programs created in different programming languages to communicate with one another. ANIMALIA will then be upgraded to serve as an ActiveX client. This two-stage upgrade will, thus, provide the basis for enhanced, real-time data acquisition/visualization within the systems and methods according to the present invention.

In such a manner, the real-time data acquisition/visualization means will function as a stand-alone application. This means will, thus, dynamically interface with standard survey data acquisition software, as long as they can be compiled into ActiveX clients. If they cannot be compiled, then communication between the programs can be accomplished via data files as presently provided. These files will be formatted to be compatible with such existing data acquisition software.

The optical switch may also be integrated into the body module itself and the dry-end instrumentation combined to produce a ruggedized modular unit. The merged programs may alternatively be integrated with the Micron Optics FBG-IS and new 1×5 optical switch such that 50 gratings can be accommodated. Data acquisition processing will be controlled through the merged programs' graphical user interface (GUI). A Micron Optics fiber Bragg grating Interrogation System (FBG-IS) may then be connected to a laptop computer via the National Instruments DAQCard DIO-24 card. The DAQCard is a 24-bit parallel digital I/O card designed for Type II PCMCIA slots, which are commonly available in laptop computers. The 1×5 DiCON Fiber Optics optical switch will interface with the serial port of the laptop computer. Switching time between channels of the unit would, thus, be under 0.32 seconds, and an additional settling period of 0.05 seconds would be needed to accurately measure between the 5 fibers. Therefore, measurements from all 50 sensors can be made every 2.0 seconds or at a sampling rate of 0.5 Hz. Moreover, by avoiding any serial interface will simplify efforts to interface the above-described module with the flexible body because it would eliminate the need to incorporate a RS-239 compatible interface in the tow cable.

Of course, the shape resolution algorithm may be refined in three directions. One of these directions build on the existing algorithm, while the other two will serve to link the shape resolution algorithm to the structural dynamics of the body structure and the acoustic data collected by the hydrophones.

Sensor wavelength shifts due to body strains were directly input into the shape resolution algorithm (i.e., no processing or filtering was performed on the data). To improve the accuracy of the shape sensing algorithm, however, signal processing strategies may be employed to filter and pre-process the raw sensor data to enhance numerical stability.

The initial algorithm is based on "moving" a local coordinate system along the array, beginning at a reference local coordinate system at a first measurement node and then iteratively estimating the next location along the body span, as well as the local coordinate system of the following measurement node. The computations linking these nodal displacements are obtained by interpolating the measured strains. There are two related drawbacks in this approach. First, the interpolation of the strains introduce some errors that are not currently estimated and corrected. Second, the computation of strain distribution along the flexible body involves "global" strains computed at previous locations measured by the sensors. These weaknesses may be remedied by computing the position of each successive node based on the global measured strains from all of the previous measurement nodes, using twisted quartic spline approximations. In that formulation, the curvature and torsion at two locations on the array are known. A twisted quartic spline is then used to estimate the position between the two known locations. Thereafter, a least squares optimization scheme may be used to refine the computation of a point given by the initial algorithm in order to fit a twisted quartic spline that would interpolate the locations already computed with the appropriate strains and the appropriate smoothness conditions (the curvature and torsion, hence the strains, involve the second and third derivatives, respectively). This would be applied only at the sensor locations, using only the measured data, thereby 41 recalibrating our algorithm as position along the length of the array is computed.

Acoustic data driven techniques may also be used to further refine the shape estimation. Such techniques can be used with the initial algorithm to further enhance its numeric stability and shape resolution accuracy. In particular, techniques based on phase-correction methods developed for Synthetic Aperture Radar (SAR) may be used. This algorithm uses an iterative windovwing procedure that isolates the source while simultaneously estimating the relative time delays (or phases in the frequency-domain) of the source wavefront. It also utilizes the information over a wide band of frequencies to estimate the body shape using a maximum likelihood estimation scheme. These additional techniques should be incorporated to improve shape estimation performance by using estimates computed from the initial shape sensing algorithm disclosed herein. and comparing this estimation to ground truth. Any computational error will produce a sequence of coefficients that tend to degrade the peaks in the frequency-wavenumber data about its nominal location. The severity of the degradation will depend on the magnitude and frequency content of the error in our estimation of the array shape.

Using a single FBG-IS would accommodate only six fiber optic measurement nodes (24 gratings/4 gratings per node), which, based on an initial analysis, would be insufficient to meet the requirements on shape resolution for most applications. Therefore, an FBG-IS with a 1×N optical switch is preferably used to sequentially pole the grating sensors at the #1, #2, #3, and #4 sens locations as illustrated in FIG. 5(b). 1×N optical switches are analogous to their electrical counterparts in that they sequentially distribute light from a single input optical fiber to any one of the N output fibers. A 1×4 optical switch, which costs roughly \$3,000, effectively quadruples the number of sensors the FBG-IS can interrogate, making 24 fiber optic measurement nodes possible. It is important to note that the "N" in the 1×N switch can literally be in the hundreds. which enables a large degree of optical system design flexibility if greater numbers of fiber optic measurement nodes are needed for improved shape estimation. The switching time of this unit is 0.25 seconds, so that measurements from all four sensors at all 24 fiber optic measurement nodes will be made every 1.0 second. Other switching units with much faster switching rates are commercially available, but are costly.

Any distributed optical fiber sensing system used with ocean survey equipment arrays faces challenges with regard to survivability during array deployment and operation. As will be explained below, these issues can be addressed with proper attention to fiber and component section, based on an understanding of the mechanical characteristics of optical fibers. Optical fibers are made from amorphous (i.e., glassy) quartz, which is an intrinsically low fracture toughness material. Low fracture toughness often implies low mechanical strength. However. optical fibers have very high mechanical strength, approaching a factor of three higher than the strongest carbon steels. The reason for these apparently contradictory statements (low fracture toughness and high strength) is that the conditions of manufacturing optical fibers are so well controlled that the initial surface flaws are on the atomic scale. When the fiber is properly coated, these very small flaws rarely exceed the critical length required for unstable crack growth in brittle materials. The highest strength fiber (proof tested at 200 ksi) is fabricated in Class 1 clean rooms and is immediately coated with a high toughness material to protect the fiber from handling-induced surface flaws. Examples of the use of high strength optical fiber in harsh operating conditions include pay-out fiber in TOW anti-tank missiles and in transatlantic communications cables. These successful applications suggest that optical fiber failure due to axial stresses can be mitigated by selecting high strength optical fiber. 3M high strength optical fiber and Bragg gratings designed and proof tested to 75,000 $\mu\epsilon$ are preferably employed with the system according to the present invention which translates to a maximum working strain of 25,000 microstrain (i.e., assuming the standard factor of safety of 3). This fiber is coated with a 3M proprietary hermetic material. However, there are several additional issues related to reliability which should be addressed.

The primary issue is potential fiber fracture due to impact loads from accidental impacts that might occur in the day-to-day at sea operations (e.g., dropped tools). Fortunately, a vast array of small diameter fiber optic cable structures have been developed by the telecommunications industry to protect against these types of impacts. A number of different small diameter cables have been investigated to assess their suitability. Based on these tests, it is believed that a "tight tube" cable configuration (i.e., a commercially available, industry standard small diameter cable assembly) is a good candidate for strain sensors according to the present invention. Tight-tube cables mold standard coated optical fiber into a hard polymer secondary coating (e.g., roughly 3 mm diameter). This cable assembly may be selected because it is robust, easy to work with, and small diameter; most importantly, it has sufficient stiffness and continuity to transfer the strains from the body to the fiber sensor. A "loose tube" assembly is preferably used for the temperature sensor. This cable structure is similar to the tight tube configuration, but the fiber floats in a soft gel-encased tubing. In this way, no axial strain will be transferred to the temperature sensor.

The use of high strength optical fiber mitigates, to a large degree, many of the mechanical reliability concerns associated with using optical fiber sensors for monitoring the shape of flexible bodies. This assertion is invalid, however. if the Bragg gratings form weak links in the optical fiber. There is no evidence to suggest that the optical aspects of writing Bragg gratings have any effect on the grating strength. However, the process of stripping the protective coating before writing the grating and then recoating it afterwards can significantly reduce strength if not done properly. Zero strength reduction gratings are achievable using fumes from concentrated sulfuric acid to strip the coating material, and then using a Vytran, Inc. fiber recoater to recoat the fiber. Mechanical testing performed on gratings manufactured by this technique showed no change in grating properties, even after 1.4 million strain cycles from 0 to 2,500 $\mu\epsilon$ and showed grating strengths in excess of 700 ksi.

Moisture absorption is also known to break down the covalent bonds in the amorphous silica dioxide optical fibers. This breakdown is known as stress corrosion because it is accelerated in the presence of non-zero stress states. At sea environments will subject optical fiber sensor systems to moisture, and therefore steps must be taken to prevent moisture absorption by the optical fiber. Fortunately, stress corrosion is well known to the optical fiber community and has been effectively defeated through the use of hermetic coatings, such as gold and carbon. Off-the-shelf hermetic coatings are offered by virtually every fiber vendor. It is important to note that the use of optical fiber sensors in undersea applications has precedent. A large worldwide effort was initiated in the mid 1980s to build and test optical fiber passive hydrophones.

In accordance with a presently preferred embodiment of the invention, high-strength fibers are used in an extrusion process to integrate the fibers at a helix angle of about 40 degrees. An ANRITSU miniature optical time domain reflectometer (OTDR) may then be used to probe the optical fiber embedded in the body for fractures. Such monitoring of the fibers with the OTDR while they are being embedded into the body and after the body experiences deformations may be useful to assess a prescribed set of handling stresses.

The range of strains that the optical fibers and fiber Bragg gratings will experience can be categorized by strains seen during deployed operations and strains due to storage on handling systems. Because of the geometry of typical storage reels, the handling strains are significantly larger than those expected during deployment and therefore are the dominant factor in the survivability analysis. The optical fibers are helixed with respect to the array body major axis to reduce the maximum storage strain experienced by the optical fiber to less than 25,000 $\mu\epsilon$. For simplicity, this analysis neglects the contributions from shear strains.

The design process begins by using strain tensor transformation equations to transform strain state due to bending to the strain state in the plane defined by the helix angle. This transformation equation is given by $\epsilon_\mu{}^* = \epsilon_{\chi\chi}[\cos^2\Psi(1+\upsilon) - \upsilon]$ where $\Psi$ is the helix angle of the fiber relative to the longitudinal axis of the body, $\epsilon_u$ is the bending strain in the direction of the longitudinal axis of the array, and the starred superscript denotes strain in the helix angle direction due to the bending, and $\upsilon$ is the Poisson's ratio (approximately 0.45 for polyurethane)

The longitudinal bending strains expected on the body are characterized by $\epsilon_{\chi\chi} = y/l$ where y is the distance the Bragg grating is located away from the bending neutral axis and I is the radius of curvature of the body. In the case of a 1.65-inch radius body and 25-inch radius storage drum, the storage strains are given by $\epsilon = 1.65/25 = 66,000$ $\mu\epsilon$ for the inner wrap of the flexible body (successive wraps of the flexible body would experience lower surface strains because the radius of curvature increases). This maximum working strain suggests a helix angle that will keep the maximum strain seen by the optical fiber below 25,000 $\mu\epsilon$. This demonstrated that a Bragg grating helix angle of about 40 degrees will be satisfactory.

Orienting the sensors at 40 degrees yields improved sensor reliability, but it will reduce the amount of strain seen by the sensors. This effect will reduce the overall shape resolution limits of the shape sensing system. To assess system resolution, we take a reverse calculation approach by using the strain measurement resolution offered by the Micron Optics FBG-IS to determine the minimum curvature we can detect in a deployed body. The minimum strain resolution of the current off-the-shelf FBG-IS is 1 $\mu\epsilon$ with a 2$\sigma$ deviation of $+/-4$ $\mu\epsilon$.

One other important aspect of the flexible body according to the present invention is the optimization of the sensor density needed to balance hardware requirements with accuracy requirements. Clearly, increasing the number of sensors along the body will result in reduced strain interpolation errors, thereby minimizing shape RMS error. However, a large number of sensors will introduce increased hardware complexity and cost and will require more complex filtering schemes to reduce noise. Therefore, a careful analysis is required to bring these issues to bear.

To determine optimal sensor density, a study of the RMS error was performed at the last sensor as a function of sensor density for the flexible body. A 100-foot section of a flexible body was simulated during steady tow maneuver with low amplitude perturbation harmonics caused by surface waves and/or the helmsman's steering (i.e., deformations expected during typical operations). The RMS error was determined for those cases where the sensors were placed 3, 5, 10, and 15 feet apart (31, 19, 10, and 7 sensor nodes, respectively). As expected, the RIMS error at the end of the 100-foot body increases as the sensor density is reduced. Based on these simulations, it is possible to perform trade off analyses of performance versus system cost and complexity.

Sensor density is also governed by the spectral characteristics of the gratings and the read- out instrumentation. The key issue here is that the gratings must be spaced so that their reflected spectra (because spectral wavelength shifts are the means by which strain is resolved) do not overlap as a result of the applied strain field. The operational strains experienced by the sensors will be significantly less than the storage strains. The bending strains for these shapes would be approximately $+/-150 \mu\epsilon$ for a 40-degree fiber helix angle on a 100-foot body. This level of strain produces wavelength shifts of ~$+/-0.15$ nm (0.30 nm range). The maximum spectral range of a standard FBG-IS is 40 nm. Therefore, the unit according to the present invention can accommodate 66 Bragg gratings per fiber body. State-of-the-art superfluorescent source technology may also be used to extend the spectral range of the FBG-IS to 80 nm, thereby enabling 132 measurement nodes per fiber with a reasonable margin of safety. When combined with the 1×5 optical switch, the proposed system will be capable of interrogating 660 Bragg grating sensors experiencing typical body strains.

Along the length of the body, there will also be a need to connect and disconnect portions of the shape sensors network. Obvious locations include where the shape sensor system connects to the read-out instrumentation and where the instrumentation modules are interconnected. There are at least one dozen industry standards for fiber optical connectors, all of which can be regarded as fiber optic "BNC" connectors.

Figure 9:
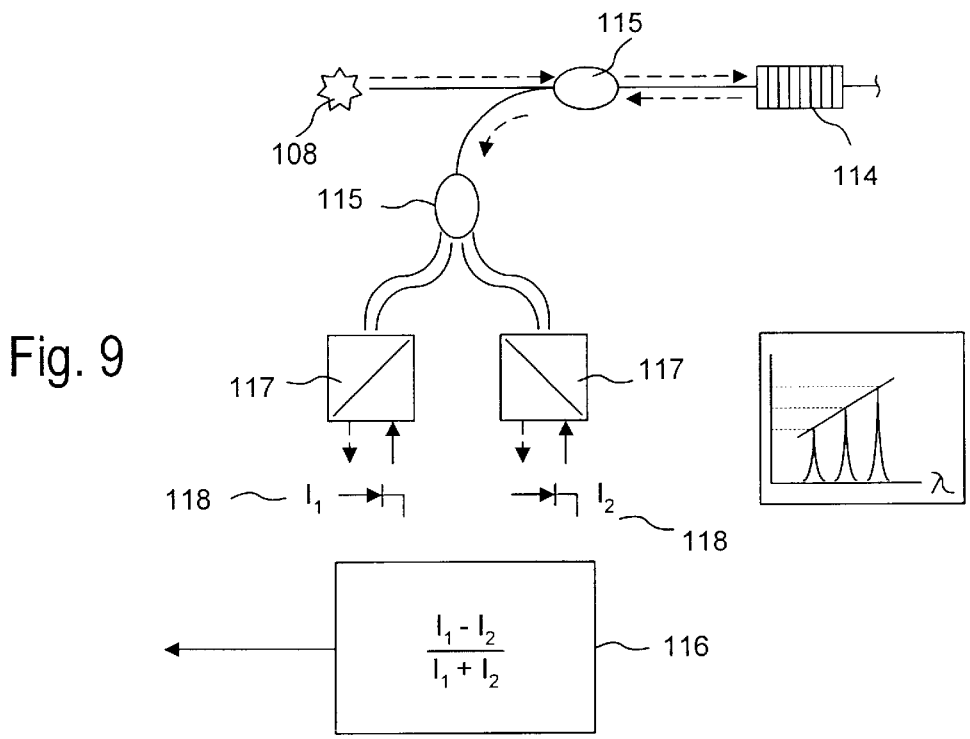
FIG. 9 illustrates apparatus for performing ratiometric demodulation in the system shown in FIG. 8.
Figure 8:
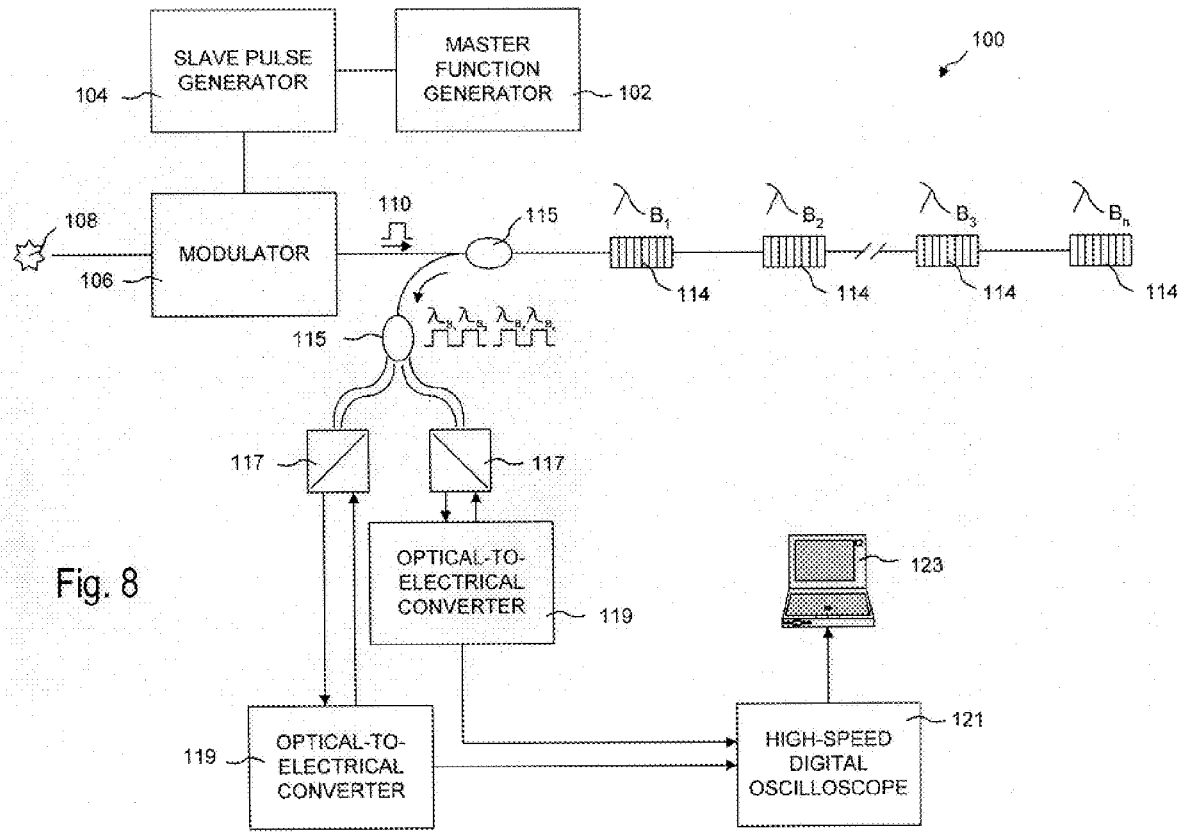
FIG. 8 is a schematic diagram of one time division multiplexing system according to still another embodiment of the present invention.

Referring now to FIGS. 8 and 9, a time division multiplexing technique and apparatus according to another embodiment of the present invention will be disclosed. FIG. 8 shows a schematic diagram of a time division multiplexing system, while FIG. 9 shows a ratiometric demodulation scheme therefor. The system 100 shown in FIG. 8 is essentially a modified OTDR, comprising in general a master function generator 102, a slave pulse generator 104, and a modulator 106 which is adapted to receive signals from a broadband source 108, an input pulse 110 of approximately nanosecond pulse width is coupled to the fiber 112 having a plurality of fiber Bragg gratings 114. Preferably, the pulse repetition rate of the signal coming from the slave pulse generator will be about 45 $\mu$sec, since 45 $\mu$sec is the approximate amount of time required for the light pulse to travel to and from a Bragg grating at the end (e.g., 4.5 kilometers) from the source 108. Such a pulse repetition rate would, thus, be advantageous for seismic survey streamers.

Using low reflectivity (i.e., about 5%) Bragg gratings, the maximum number of gratings at a single wavelength would be about sixty. About six different Bragg wavelengths can be used for a $\pm 3000 \mu\epsilon$ strain field. Therefore, the total number of sensors per fiber would be about 360. In a 4.5 kilometer streamer (such as that shown in FIG. 1), five sensors would be required for each sensing node, with one sensing node every 150 meters. Accordingly, there would be about 150 sensors in each streamer. One distinct advantage attending the system according to this embodiment is the lack of any need for an optical switch.

Figure 10:
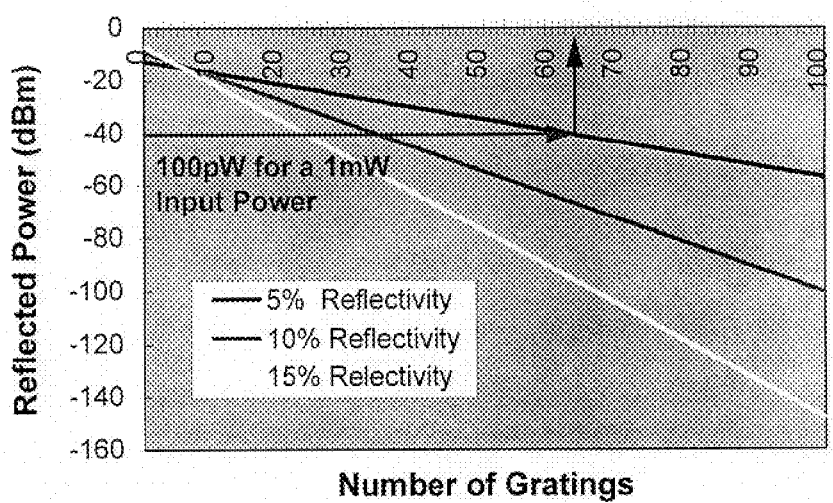
FIG. 10 graphically depicts reflected power as a function of the number of Bragg grating sensors used in systems according to the present invention.
Figure 11:
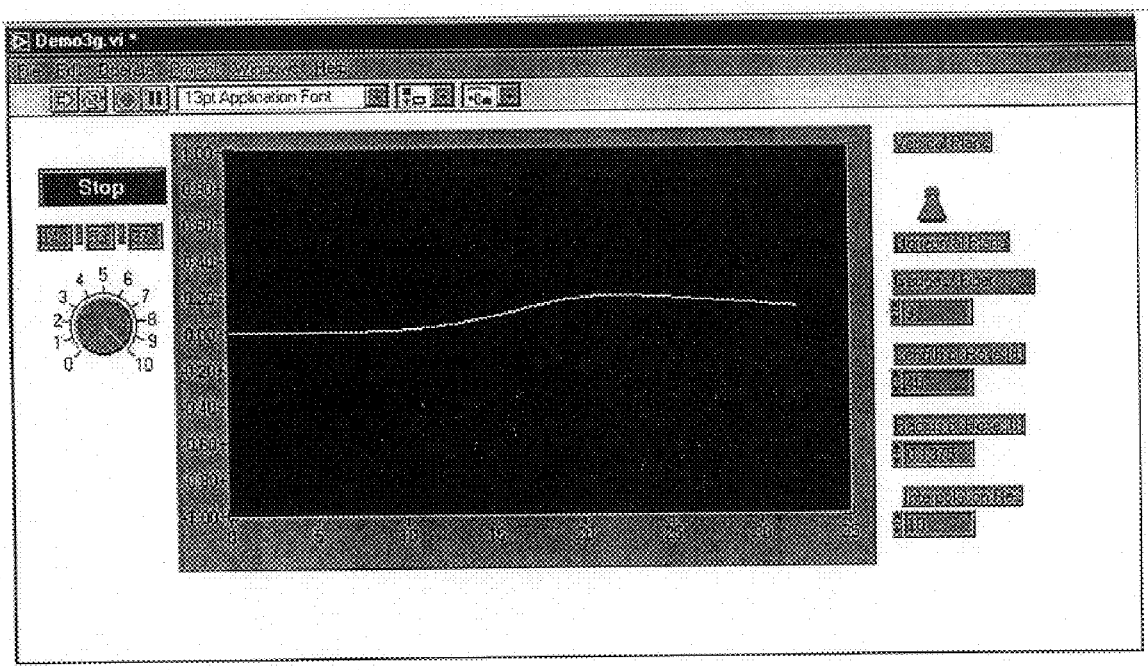
FIG. 11 is a screen capture from the real-time data acquisition and visualization means according to the present invention.

Ratiometric demodulation is performed according to this embodiment on each pulse. In such a manner, and referring now to FIG. 9, the light coming from the broadband source 108 is coupled through the fiber and returns from the Bragg grating(s) along the path indicated by the gras arrows. The return signal is then split and sent through a filter 116. Filter 116 is selected to linearly vary the intensity of the return signal as a function of its wavelength, with the range of the system 100 being limited only by the linear range of the filter 116. The split signal is then fed through a pair of detectors 118 such that the output signal from the filter 116 is proportional to the measurand (i.e., $(I_1-I_2)/(I_1+I_2)$). The reflected power (dBm) as a function of the number of Bragg gratings used, at the same wavelength, in accordance with the present invention is shown for a variety of reflectivity in FIG. 10.

The examples shown herein are not meant to limit the scope of the invention. Accordingly, modifications and variations according to the present invention will become apparent to those of ordinary skill in the art, without departing from the spirit and scope thereof.

What we claim as our invention is:

1. A fiber optic shape measurement system comprising:
    a flexible body;
    a plurality of fiber optic measurement nodes coupled to said body and linearly displaced at preselected intervals along the length of said body, each said fiber optic measurement node including Bragg grating sensor means that is responsive to bending, axial deformation, torsion and temperature and adapted to output signals indicative thereof;
    a light source for inputting light into each of said fiber optic measurement nodes;
    multiplexing signal processing means connected to said fiber optic measurement nodes; and
    data post processing and display means coupled to receive said output signals from said multiplexing signal processing means, said data post processing means including strain-to-shape stmctural analysis means for decoupling said output signals and, thereby, provide a real-time display of the shape of said body.

2. The fiber optic shape measurement system of claim 1, wherein said Bragg grating sensor means comprise discrete sensors.

3. The fiber optic shape measurement system of claim 1, wherein said Bragg grating sensor means comprise fully distributed sensors.

4. The fiber optic shape measurement system of claim 1, wherein said Bragg grating sensor means comprise quasi-distributed path integrating sensors.

5. The fiber optic shape measurement system of claim 1, wherein said Bragg grating sensor means comprises a first Bragg grating sensor and a second Bragg grating sensor.

6. The fiber optic shape measurement system of claim 5, wherein said first Bragg grating sensor and said second Bragg grating sensor each respond substantially identically to axial deformation and temperature, but substantially differently to bending.

7. The fiber optic shape measurement system of claim 5, wherein said first Bragg grating sensor and said second Bragg grating sensor are each helically oriented at a helix angle with respect to the longitudinal axis of said body.

8. The fiber optic shape measurement system of claim 7, wherein said helix angle is selected to balance Bragg grating sensor survivability under strain and Bragg grating sensor performance.

9. The fiber optic shape measurement system of claim 8, wherein said helix angle is from about 30 degrees to about 50 degrees.

10. The fiber optic shape measurement system of claim 9, wherein said helix angle is about 40 degrees.

11. The fiber optic shape measurement system of claim 1, wherein said Bragg grating sensor means includes a first Bragg grating sensor and a second Bragg grating sensor that are separated by about 90 degrees in radial azimuth.

12. The fiber optic shape measurement system of claim 1, wherein said Bragg grating sensor means comprises a first Bragg grating sensor, a second Bragg grating sensor, a third Bragg grating sensor and a fourth Bragg grating sensor.

13. The fiber optic shape measurement system of claim 12, wherein:
    said first Bragg grating sensor, said second Bragg grating sensor, and said third Bragg grating sensor each respond substantially identically to axial deformation and temperature, but substantially differently to bending; and
    said fourth Bragg grating sensor provides temperature information independent of strain.

14. The fiber optic shape measurement system of claim 12, wherein said first Bragg grating sensor is coupled to said body at 0 degrees radial azimuth position, said second Bragg grating sensor is coupled to said body at 90 degrees radial azimuth position, said third Bragg grating sensor is coupled to said body at 180 degrees radial azimuth position, and said fourth Bragg grating sensor is coupled to said body at 270 degrees radial azimuth position.

15. The fiber optic shape measurement system of claim 12, wherein said first Bragg grating sensor, said second Bragg grating sensor, said third Bragg grating sensor, and said fourth Bragg grating sensor are helically oriented at a helix angle with respect to the longitudinal axis of the body.

16. The fiber optic shape measurement system of claim 15, wherein said helix angle is about 40 degrees.

17. The fiber optic shape measurement system of claim 12, wherein said Bragg grating sensor means measurement node further comprises a fifth Bragg grating sensor.

18. The fiber optic shape measurement system of claim 17, wherein said fifth Bragg grating sensor is coupled to said body substantially adjacent to said first Bragg grating sensor.

19. The fiber optic shape measurement system of claim 17, wherein:
    said first Bragg grating sensor, said second Bragg grating sensor, and said third Bragg grating sensor each respond substantially identically to axial deformation and temperature, but substantially differently to bending;
    said fourth Bragg grating sensor provides temperature information independent of strain; and
    said fifth Bragg grating sensor responds substantially differently to torsion than do said first Bragg grating sensor, said second Bragg grating sensor, and said third Bragg grating sensor.

20. The fiber optic shape measurement system of claim 19, wherein said first Bragg grating sensor is coupled to said body at about 0 degrees radial azimuth position, said second Bragg grating sensor is coupled to said body at about 90 degrees radial azimuth position said third Bragg grating sensor is coupled to said body at about 180 degrees radial azimuth position, said fourth Bragg grating sensor is coupled to said body at about 270 degrees radial azimuth position and said fifth Bragg grating sensor is coupled to said body at about 0 degrees radial azimuth position.

21. The fiber optic shape measurement system of claim 19, wherein said first Bragg grating sensor, said second Bragg grating sensor, said third Bragg grating sensor, said fourth Bragg grating sensor, and said fifth Bragg grating sensor are helically oriented at a helix angle with respect to the longitudinal axis of said body.

22. The fiber optic shape measurement system of claim 1, wherein said multiplexing signal processing means comprises a spatial multiplexer.

23. The fiber optic shape measurement system of claim 22, wherein said spatial multiplexer comprises a 1×4 switch.

24. The fiber optic shape measurement system of claim 22, wherein said spatial multiplexer comprises a 1×5 switch.

25. The fiber optic shape measurement system of claim 22, wherein said spatial multiplexer comprises a 1×N switch.

26. The fiber optic shape measurement system of claim 22, wherein said spatial multiplexer comprises an M×N switch.

27. The fiber optic shape measurement system of claim 1, wherein said multiplexing signal processing means comprises a wavelength division multiplexer.

28. The fiber optic shape measurement system of claim 27, wherein said wavelength division multiplexer comprises a Bragg grating strain demodulator.

29. The fiber optic shape measurement system of claim 1, wherein said multiplexing signal processing means comprises:
  a hybrid spatial multiplexer; and
  a wavelength division multiplexer.

30. The fiber optic shape measurement system of claim 29, wherein said spatial multiplexer comprises an M×N switch and said wavelength division multiplexer comprises a Bragg grating strain demodulator.

31. The fiber optic shape measurement system of claim 1, further comprising a protective coating enveloping said sensors.

32. The fiber optic shape measurement system of claim 1, wherein said protective coating comprises a tight tube configuration.

33. The fiber optic shape measurement system of claim 1, wherein said protective coating comprises a loose tube configuration.

34. The fiber optic shape measurement system of claim 1, wherein said data postprocessing and display means comprises a digital computer.

35. A multimode/single-mode fiber interface for a flexible body, comprising:
  Bragg grating sensor means coupled to the body and linearly displaced at preselected intervals along a length of the body, responsive to bending axial deformation, torsion and temperature, and adapted to output signals indicative thereof;
  an optical slip ring coupling said Bragg grating sensor means to one or more optical fibers;
  means for detecting fractures in said optical fibers;
  means for protecting said Bragg grating sensor means;
  a light source for inputting light into each of said Bragg grating sensor means; and
  multiplexing signal processing means connected to said Bragg grating sensor means and adapted to provide a real-time display of the shape of the body.

36. A method of determining, the shape of a flexible body, comprising, the steps of:
  (a) measuring thermomechanical strains about the x—x neutral axis, the y—y neutral axis, the z—z neutral axis, and the x-y axis of the shape, the thermomechanical strain measurements being taken at a multiplicity of fiber optic measurement nodes, each of which include one or more Bragg grating sensors displaced at preselected intervals about and along the body;
  (b) measuring temperature at said multiplicity of fiber optic measurement nodes;
  (c) decoupling x—x, y—y, z—z, and x-y mechanical strains, respectively, from corresponding ones of said thermomechanical strains measured at said multilicity of fiber optic measurement nodes;
  (d) fitting said x—x mechanical strains to an x-curve fitting function, said y—y mechanical strains to a y-curve fitting function, said z—z mechanical strains to a z-curve fitting function, and said x-y mechanical strains to a torsional fitting function; and
  (e) determining x, y, z, and torsional deformations of the body, respectively, through an x-curve processing function, a y-curve processing function, a z-curve processing function, and a torsional-curve processing function.

37. The method according to claim 36, wherein said x curve fitting function, said y curve fitting function, and said axial curve fitting function are each moving spline functions.

38. The method according to claim 37, wherein:
  (a) said x processing function integrates the x moving spline functions twice to determine the x displacement of the body, taking care to incorporate correct boundary and symmetry conditions;
  (b) said y processing function integrates the y moving spline functions device to determine the y displacement of the body, taking care to incorporate correct boundary and symmetry conditions; and
  (c) said axial processing function integrates the axial moving spline function once to determine the z displacement of the body, taking care to incorporate correct boundary and symmetry conditions.

39. The method according to claim 38, wherein said x curve fitting function, said y curve fitting function, and said axial curve fitting function are all least squares fitting functions.

40. The method according to claim 36, further comprising the steps of:
  (h) measuring torsional deformations of the body, the torsional deformation measurements being taken at a multiplicity of fiber optic measurement nodes, the torsional deformations being due to shear strains at said fiber optic measurement nodes;
  (i) fitting the measured torsional deformation to a torsional deformation curve fitting function; and
  (j) determining the twist deformation of the body through a twist deformation processing function.

41. The method according to claim 36, further comprising the step of prior to steps (a) through (g), filtering and pre-processing raw sensor data to enhance numerical stability.

42. A monitoring method for maintaining the shape of a towed flexible body, comprising the steps of:
  (a) coupling a plurality of fiber optic measurement nodes to the body, each of which includes one or more Bragg grating sensor means and is linearly displaced at preselected intervals therealong;
  (b) adapting each said fiber optic measurement node to be responsive to environmental factors selected from the group consisting of bending, axial deformation, torsion, and external temperature of the body;
  (c) inputting light into each of said fiber optic measurement nodes from a light source selected to generate output signals from said Bragg grating sensor means measurement nodes that are indicative of said environmental factors;

(d) multiplexing said output signals;

(e) decoupling said multiplexed signals with strain-to-shape structural analysis means; and (f) first displaying the shape of the body in real-time by inputing said decoupled multiplexed signals to display means;

(g) providing a post-processing means for adjusting a monitored shape of the body based on said display, and (h) adiusting the body.

43. The method according to claim 42, further comprising the steps of:

(i) providing a plurality of in-fiber Bragg gratings for each said fiber optic measurement node;

(j) helically orienting each of said in-fiber Bragg gratings to minimize effects of said environmental factors.

44. The method according to claim 43, further comprising the steps of:

(k) first selecting an angle for said helical orientation step of from about 30 degrees to about 50 degrees from the longitudinal axis of the body;

(l) second selecting a number N of in-fiber Bragg gratings for each said fiber optic measurement node;

(m) third selecting a spacing between adjacent pairs of said fiber optic measurement nodes to provide M sensors along the length of the body; and (n) demodulating N×M output signals to provide said real-time display.

45. The method according to claim 44, wherein said demodulating step comprises ratiometric demodulating.

46. The method according to claim 42, further comprising the steps of:

(o) providing an input to said monitor means indicative of a spatial position of at least one end of the body in three dimensions, and (p) second displaying a dynamic shape of the body in real-time with said monitor means, wherein said dynamic shape is indicative of an approximate shape of the body at all times in said three dimensions.

47. The method according to claim 42, further comprising the step of monitoring for fractures in said fiber optic measurement nodes using an optical time domain reflectometer (OTDR).

48. The method according to claim 45, wherein said ratiometric demodulating step comprises time division multiplexed ratiometric demodulaing.

49. The method according to claim 48, wherein said time division multiplexed ratiometric demodulating step comprises the substeps of:

providing pulse generating means, operably coupled to receive broadband light from said light source, for generating a plurality of pulses of light and inputting said plurality of pulses of light to said Bragg grating sensor means;

selecting a pulse repetition rate for said plurality of pulses of light;

generating said plurality of pulses of light at said pulse repetition rate;

inputting said plurality of pulses of light to said Bragg grating sensor means;

providing a return path for measuring a power of said plurality of pulses of light reflected by said Bragg grating sensor means; and measuring the power of each said reflected pulse of light.

50. The method according to claim 49, wherein said pulse generating means comprises:

a master function generator;

a slave pulse generator operably coupled to said master function generator for control thereby; and a modulator operably coupled to said slave pulse generator and adapted to receive said broadband light from said light source, to thereby covert said broadband light into said plurality of pulses of light at said selected pulse repetition rate.

51. The method according to claim 50, wherein said solving substep further comprises:

selecting a pulse width of said plurality of pulses of light;

selecting a wavelength of said plurality of pulses of light;

determining an associated pulse repetition rate consistent with said selected pulse width and said selected wavelength, wherein said associated pulse repetition rate is proportional to a distance from said pulse generating means to the Bragg grating sensor means at a distal end of the body.

52. The method according to claim 51, wherein said associated pulse repetition rate is selected from a range of about forty to fifty microseconds.

53. The method according to claim 52, wherein said selected pulse repetition rate comprises about forty-five microseconds.

54. The method according to claim 51, wherein said selected pulse width comprises about one nanosecond.

55. The method according to claim 49, wherein said substep providing said return path comprises:

providing means for splitting each said reflected pulse of light into a first input signal and a second input signal; and providing filtering means coupled to receive said first input signal and said second input signal and output therefrom, respectively, a first output signal and a second output signal, wherein said filtering means is selected to determine a measurand that is a function of said first output signal and said second output signal.

56. The method according to claim 55, wherein said measurand comprise a ratio between said first output signal and said second output signal.

57. The method according to claim 56, wherein said first output signal is representative of a difference between the powers of said first input signal and said second input signal, and said second output signal is representative of a sum of the powers of said first input signal and said second input signal.

58. The method according to claim 57, further comprising the step of selecting said filtering means to linearly vary the powers of said first input signal and said second input signal the return signal as a function of said selected wavelength.

59. The method according to claim 58, wherein said measurand comprises a function$(I_1-I_2)/(I_1+I_2)$, where $I_1$ is said first input signal and $I_2$ is said second input signal.

60. The method according to claim 59, further comprising the step of selecting a reflectivity of said Bragg grating sensor means from a plenty of reflectivities.

61. The method according to claim 60, wherein said plurality of reflectivities is selected from a plurality of relatively low reflectivities.

62. The method according to claim 60, wherein said plurality of reflectivities is selected from the group consisting of five percent, ten percent, and fifteen percent.

63. The method according to claim 62, wherein said selected reflectivity comprises five percent.

64. The method according to claim 49, wherein said Bragg grating sensor means comprises a plurality of Bragg gratings, each of which has a Bragg wavelength selected from a plurality of discrete Bragg wavelengths.

65. The method according to claim 64, further comprising the step of selecting from a group of about six Bragg wavelengths.

66. The method according to claim 64, further comprising the step of selecting from a group of Bragg wavelengths of sufficient width to facilitate said plurality of Bragg gratings measuring a selected strain field.

67. The method according to claim 66, wherein said selected stain field comprises about ±3000 microstrain ($\mu\epsilon$).

68. The method according to claim 64, wherein said plurality of Bragg gratings comprises a number n, each having a preselected reflectivity R, and said measuring substep further comprises the step of calculating a power P, which is reflected from a particular one of said plurality of Bragg gratings that is positioned most closely to said distal end of the body, as a function of the equation:

$$P=I_0R(1-R)^{2(n-1)},$$

where $I_0$ is a selected input power of said plurality of light pulses.

69. The method according to claim 68, further comprising the step of selecting said input power such that said reflected power P will exceed a minimum power.

70. The method according to claim 69, wherein said minimum power comprises about one hundred picowatts.

71. The method according to claim 69, wherein said selected input power comprises about one milliwatt.

* * * * *